(No Model.)
J. S. & S. B. EZELL.
INSECT TRAP.
No. 372,257. Patented Oct. 25, 1887.
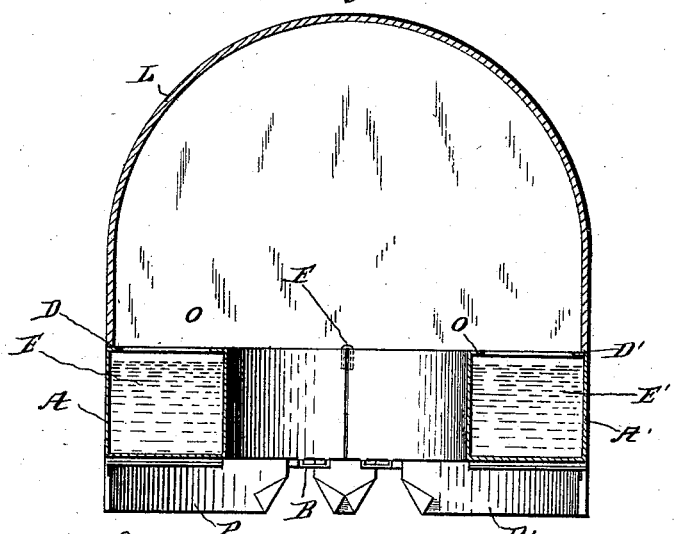
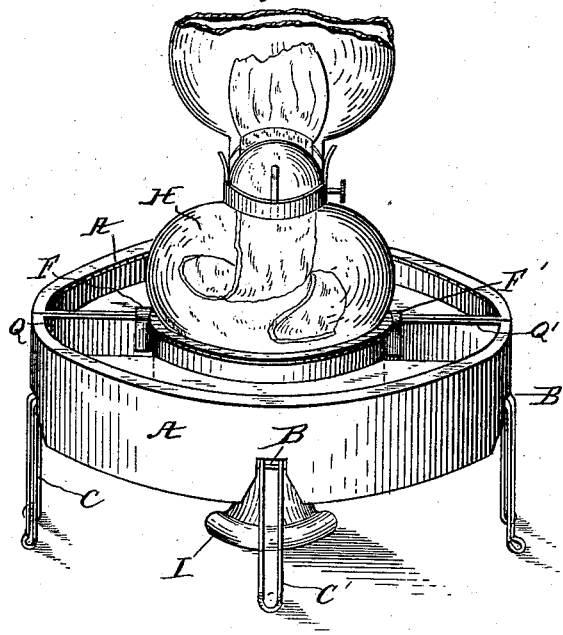
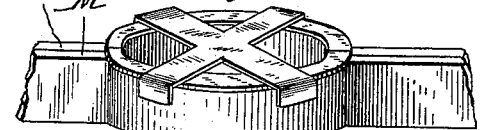
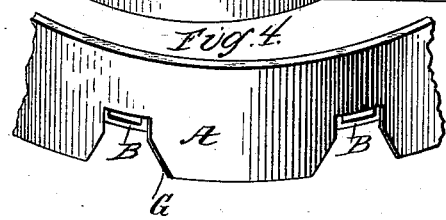
Witnesses
Wm. H. Scott.
O. W. Werle.
Inventor
John S. Ezell
Saml. B. Ezell
By their

UNITED STATES PATENT OFFICE.

JOHN S. EZELL, OF WOODRUFF'S, AND SAMUEL B. EZELL, OF SPARTANBURG, SOUTH CAROLINA.

INSECT-TRAP.

SPECIFICATION forming part of Letters Patent No. 372,257, dated October 25, 1887.

Application filed April 28, 1887. Serial No. 236,478. (No model.)

*To all whom it may concern:*

Be it known that we, JOHN S. EZELL and SAMUEL B. EZELL, of Woodruff's and Spartanburg, respectively, both in the county of Spartanburg and State of South Carolina, have invented certain new and useful Improvements in Insect-Traps; and we do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to an insect-trap for night or day use; and its object is to provide a convenient and portable device containing a reservoir of destroying-fluid around a central lamp or illuminated field, in flying against which latter the insects drop into the fluid and are drowned or otherwise destroyed.

To this end our invention consists in an annular reservoir made in sections, and clamps for connecting or disconnecting said sections.

It consists, also, in providing such a reservoir with a downwardly-extending supporting-flange having openings at suitable distances, through which insects may pass to the central opening within the annular chamber, and a top cover for said reservoir.

It consists, also, of other features and certain details of construction, which will be hereinafter specifically pointed out in the claims.

In the accompanying drawings, which illustrate our invention, Figure 1 is a vertical section of the trap with the cover applied. Fig. 2 is a perspective view of the device with the cover removed and legs applied, showing a lamp provided with a stem-support in position. Fig. 3 is a detail view showing a part of the trap as used with a lamp having no supporting-stem. Fig. 4 is an enlarged detail of the trap with the supporting-legs removed.

The device consists of two semi-annular reservoirs, A A', Figs. 1 and 2, made of any suitable material, provided with inwardly-extending flanges D D', O O', Q Q', Figs. 1 and 2. These flanges serve a dual function. They prevent a ready spilling of the fluid within the reservoir and render it difficult for entrapped insects to crawl out of the reservoir. These reservoirs A A' are held together by clamps F F', Figs. 1 and 2, permanently secured to one of them. The reservoirs are also provided with vertical extensions P P' on the outer sides and at the junction sides, M M', Fig. 3, extending below the bottom of the reservoirs and cut out at intervals to enable insects to have easy access to the interior. At the top of these recesses G are secured sockets B, arranged radially on the bottom of the reservoir, into which sockets wire legs or supports C are inserted to sufficiently raise the reservoirs to bring the inner ring, F, against the oil-chamber of the lamp when the device is used with the same. These legs may be conveniently made, as shown, of stiff wire bent to bring the two ends sufficiently close together, and the two ends are then bent at right angles, so that when slipped into the sockets B the portion C will be of a length sufficient to raise the reservoirs to the lamp-chamber, as described above. The entering legs are spread a little wider than their socket B, so that when inserted they will be held by their resiliency firmly in the socket.

K, in Fig. 3, is a support to uphold a lamp over the reservoir when said lamp has no stem-support of its own, so that its oil-chamber may rest on K. During the day, when artificial light is not needed, a cover, L, of glass or wire-gauze, rests on the outer rim of the trap, and the feet C are removed. A suitable bait may then be placed within the base P P'.

The insects at night-time are attracted to the light, and being rendered helpless by the heat or by their impact with the lamp, fall into the fluid in the reservoir. This fluid may be oil, water, or a viscous fluid, and may be impregnated with an insecticide, if desired. During the day the insects creep through the exterior openings, G, toward the central bait. When they rise, they crawl or fly toward the field of illumination at the top and fall into the reservoir.

Having thus described our invention, what we claim, and desire to secure by Letters Patent, is—

1. In an insect-trap, the combination of an annular reservoir having a central opening, and removable legs or supports for said reservoir, said legs having horizontal extensions, and sockets for said extensions on the bottom of the reservoir, as described.

2. In an insect-trap, the combination of two semi-annular reservoirs, clamps for holding said reservoirs together, sockets in the lower part of said reservoirs, and removable legs in said sockets, whereby the reservoirs may be placed around a lamp-chamber and supported in position, as described.

3. In an insect-trap, the combination of two semi-annular reservoirs having a central opening, a base for said reservoirs having openings between the supporting parts, and flanges to the walls of the reservoirs above the liquid-level, each flange turned toward the reservoir, as set forth.

4. In an insect-trap, the combination of an annular reservoir having a central opening, an outer downward-extension wall to said reservoir, openings in said extension at intervals along its bottom, and a light-admitting cover to said reservoir, as set forth.

5. In an insect-trap, the combination of an annular reservoir having a central opening, an outer downward-extension wall to said reservoir, openings in said extension at intervals around the bottom, and flanges to the walls of said reservoir, each flange turned toward the reservoir, as set forth.

6. In an insect-trap, the combination of an annular reservoir having a central opening and a removable lamp-support bridging said opening, and detachable legs or supports for the reservoir, as set forth.

7. An insect-trap comprising two semi-annular reservoirs, clamps for securing said reservoirs together, fluid within said reservoirs, a base for said reservoirs having openings between the supporting parts, inwardly-turned flanges to the top of the walls of said reservoirs, and a light-admitting cover over said reservoirs, substantially as described.

8. An insect-trap comprising the following parts: two semi-annular reservoirs, clamps for securing them together, inwardly-turned flanges to said reservoirs, downwardly-extending wall to said reservoirs, openings on the lower edge of said extension at intervals, removable legs to said reservoirs, and a light-admitting cover for said reservoirs, substantially as and for the purpose set forth.

In testimony that we claim the foregoing as our own we affix our signatures in presence of two witnesses.

JOHN S. EZELL.
SAMUEL B. EZELL.

Witnesses:
L. MENG,
J. J. EZELL.